3,091,073
ROTARY MOWER

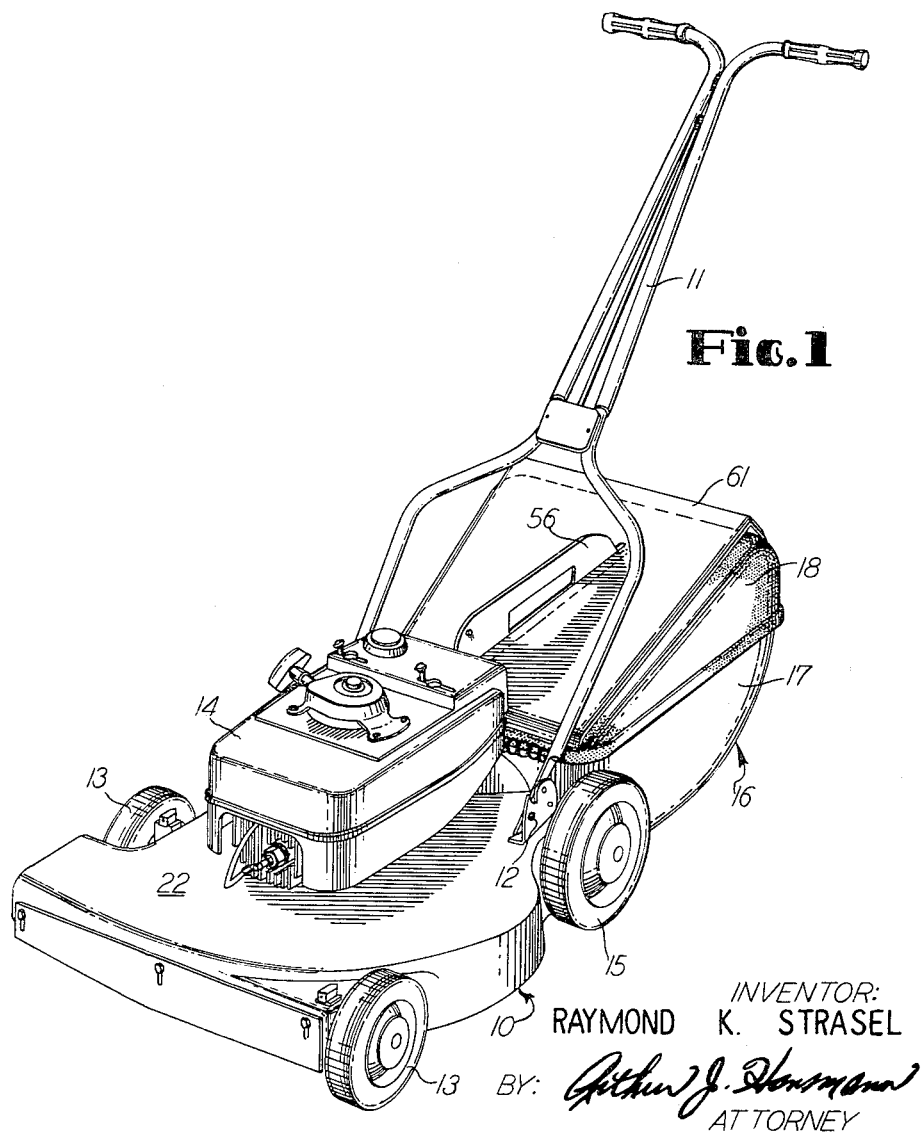

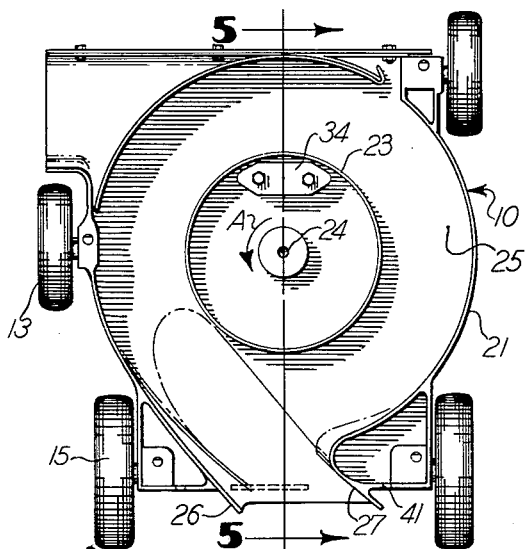
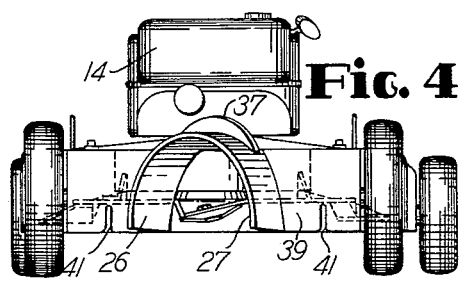
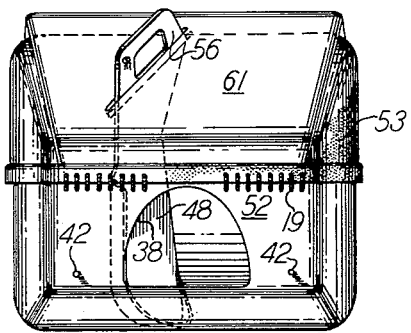
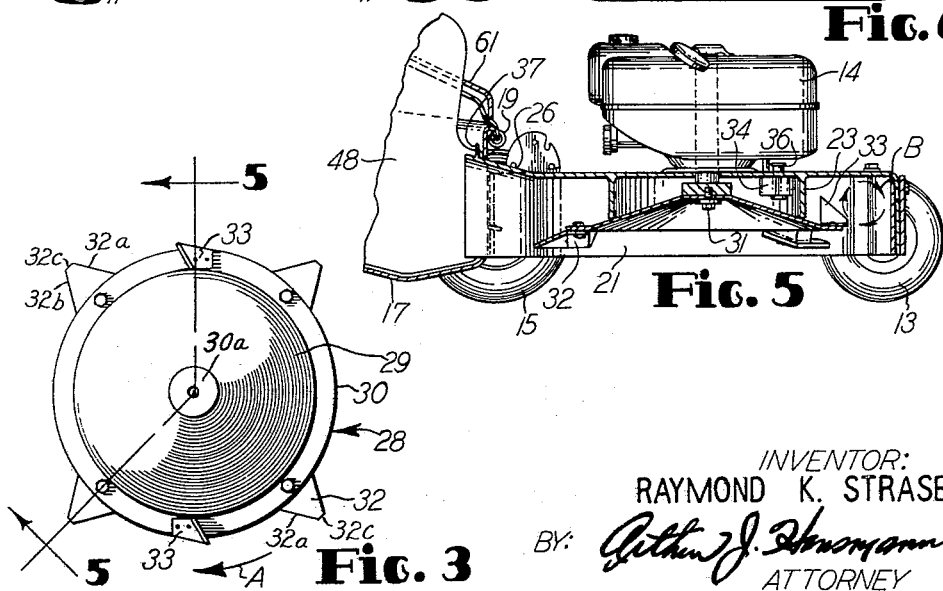

Raymond K. Strasel, Winthrop Harbor, Ill., assignor to Jacobsen Manufacturing Co., Racine, Wis., a corporation of Wisconsin Original application Sept. 9, 1957, Ser. No. 682,863, now Patent No. 2,955,402, dated Sept. 10, 1960. Divided and this application June 13, 1960, Ser. No. 35,469

9 Claims. (Cl. 56—25.4)

This invention relates to a rotary lawn mower. This is a division of application Serial No. 682,863, filed Sept. 9, 1957, now Patent No. 2,955,402.

It is an object of this invention to provide a rotary lawn mower wherein the grass clippings are discharged from the mower to avoid the common problem of the clippings clinging to the undersurface of the housing or deck when mowing in damp grass with a rotary type of mower.

Another object of this invention is to provide a rotary lawn mower wherein the rotor and the housing are arranged to produce a high velocity of movement of clippings through and out of the housing.

Other objects and advantages will become apparent upon reading the following description in conjunction with the accompanying drawings, wherein:

FIG. 1 is a front perspective view of a preferred embodiment of a rotary lawn mower of this invention, and with a grass catcher attached thereto.

FIG. 2 is a bottom plan view of the rotary mower with parts removed.

FIG. 3 is a top plan view of the rotor employed in said mower.

FIG. 4 is a rear elevational view of the mower shown in FIG. 2 with the rotor of FIG. 3 added thereto.

FIG. 5 is a side sectional view showing a fragment of the mower and catcher combined and with the section taken on the line 5—5 of FIGS. 2 and 3.

FIG. 6 is a front elevational view of the catcher.

The same reference numerals refer to the same parts throughout the views.

FIG. 1 shows a rotary lawn mower including a housing or a deck 10, of a generally cylindrical shape in plan view, and a handle 11 is pivotally attached to the housing by mounting bolts, such as the shown bolt 12, and the handle extends upwardly and rearwardly from the mower housing 10. Suitable ground wheels 13 and 15 are mounted on the mower housing, and the usual gasoline engine 14 is also shown mounted on the housing for driving the rotor disposed within the housing and hereinafter described. A grass catcher 16 is also shown mounted on the housing 10 at the rear thereof to be disposed within the lateral limits of the housing and beneath the handle 11. Of course, the catcher 16 is removably mounted on the rear end of the housing 10 so that when the catcher is filled with grass clippings, it can be readily and easily removed from the housing for emptying the clippings from the catcher. FIG. 5 shows the manner in which the catcher is mounted on the housing, and it is composed of a lower section 17 and an upper section 18 which are hinged together by means of ring members or hinges 19.

FIG. 2 shows an underneath interior of the housing 10, and it will here be noted that the housing is provided with an outer circular baffle or flange or skirt 21 which depends from the top surface 22 of the housing to terminate slightly spaced above the ground as shown in FIG. 5. An interior baffle or ring 23 also depends from the housing top 22, but the baffle 23 is shown to be shorter than the baffle 21, as shown in FIG. 5. The usual engine shaft 24 projects through the housing top 22 such that the shaft 24 and the baffle 23 and the baffle 21 are all concentric. A chute or spout 26 is formed on the rear of the housing 10 to be tangential with the annulus-like space 25 defined by and between the baffles 21 and 23, and the chute thus projects rearwardly at an oblique angle to the forward direction of movement of the mower housing 10. The chute 26 is of an inverted U-shape as shown in FIG. 4, and it defines an outlet opening 27 in the housing 10.

FIGS. 3, 4, and 5 show a horizontally rotatable mower rotor or cutter generally designated 28, and the rotor is shown to consist of a frusto-conical plate 29 which is attached to the engine shaft 24 by means of the bolt 31, as shown in FIG. 5. It is important to note that the plate 29 extends in a radially outer edge 30, which is a downwardly offset portion of said cutter, to a location beyond the circumferential limits of the inner baffle 23, and the outer circumference of the plate 29 has attached thereto a plurality of grass cutting blades 32 and a plurality of fan blades 33. The smaller diameter end or radially inward portion 30a of the cutter 28 is a non-offset portion of said cutter. The outer ends 32c of the blades 32 constitute the outer extremity of the cutter 28. The rotor plate is generally as shown and described in U.S. Patent No. 2,737,772, except for the fan blades 33 which are included therein in the shown position radially inward from the radially outer limit of the cutting blades 32. Thus, the cutter blades 32 have cutting edges 32a and 32b on opposite edges of the blades 32, the same as edges 38 and 39 of said patent. The rotor 28 is also termed a blade with cutting edges 32a and 32b. The direction of rotation of the shaft 24 and the cutter 28 is as indicated by the arrows "A" in FIGS. 2 and 3, such that the grass clippings, cut by the blades 32, and the air, blown by the blades 33, are discharged in a stream from the housing 10 through the outlet 27 which is disposed at the tangential and, therefore, most efficient angle, as mentioned. FIG. 5 shows that both types of blades are disposed in the annulus between the baffles 21 and 23, and, since the plate 29 overlaps the inner ring or baffle 23, as the latter intersects the conical portion of the rotor 28 when projected thereto, it has been found that the grass clippings, dust, dirt, and other debris cannot enter within the confines of the ring 23 and accumulate on the underneath surface of the housing or deck top 22. Further, the provision of the fan blades 33 provides a circular or turbulent action of air in the annulus, such that the air takes the path indicated by the arrows "B" in the annulus on FIG. 5, and this further prevents the grass clippings and debris from accumulating in the housing 10. Fan blades 33 are, therefore, shaped as shown, and pitched upwardly toward the upper end of flange 21, to induce a turbulent action of the air within the housing 10 to keep the latter clean and free of grass clippings which would otherwise accumulate in the housing when the mower is used in wet grass and the clippings are impinged against the undersurface of the housing. With the type of rotor described and its fan blades 33, there is also created a suction-lift from the ground beneath the housing, and this lift keeps the clippings from falling onto the ground, but it also draws dust and light debris into the housing. Such dust and debris is prevented from entering inside the ring 23 by the plate 29, and it is eventually discharged into the catcher 16.

At this time it should also be noted that the engine muffler 34 is bolted to the underneath surface of the deck 10 to receive the exhaust from the engine 14 in the usual manner. The muffler is located within the confines of the baffle 23, and FIG. 5 shows the muffler has an exhaust pipe 36 extending upwardly therefrom through the housing top 22 such that the final exhaust is above the housing rather than below the housing top 22. The particular provision of the circular rotor plate 29 forming a chamber with the housing top 22 and the baffle 23 provides a unique structure wherein the muffler 34 is located, and an improved muffler action results. It should now be understood that the provision of the rings or baffles 21 and 23 provides an interior annulus-like space 25 in which the cutting and fan blades operate, and the air is moved by the fan blades through the annulus 25 at a high velocity by virtue of the provision of the inner baffle 23 forming a wall for the high velocity of the air being discharged to the opening 27. In this manner, it has been found that the grass clippings can be adequately retained in the housing and moved therearound to be discharged through the opening 27 and into the basket 16, as desired.

FIGS. 2, 4, and 5 show the chute 26 extending rearwardly and angularly of the housing 10, and a lug or projection 37 is disposed on the top surface of the chute 26. FIG. 6 shows that the front of the catcher lower section 17 has an inlet opening 38 which receives the rearward end of the chute 26, such that the upper edge of the catcher upright front wall 52 defining the opening 38 is disposed beyond the lug 37 to hook thereover in mounting the catcher on the chute 26. FIG. 4 shows the rear wall 39 of the housing 10 to be provided with two indentations or slots 41 at the lower edge thereof such that the slots 41 respectively register with the alignment pins or bolts 42 on the front wall of the catcher 16, and thus the pins 42 are received in the slots 41, as shown in FIG. 5. In this manner, the catcher 16 is mounted on the housing 26 with the front wall of the catcher abutting the rear wall 39 of the housing, and the catcher opening and chute lug 37, along with the alignment pins described, maintain the catcher on the housing until the rear end of the catcher is tilted upward to remove the alignment pins from the slots 41, and subsequently the catcher opening 38 can be removed from the lug 37. The catcher also has a handle 56, and a top 61. Further, the catcher has an upright front wall 52 and a perforate side wall 53, and an upright partition 48 is disposed within the catcher and extends along the interior of the catcher from the wall 52 on one side of the opening 38.

While a specific embodiment of this invention has been shown and described, it should be obvious that certain changes could be made, and the invention should therefore, be limited only by the scope of the appended claims.

What is claimed is:

1. A rotary lawn mower comprising a mower housing including a depending and circular outer flange portion and a depending and circular inner baffle portion spaced radially inward from said outer flange portion and terminating at an elevation above the lower edge of said outer flange portion, said portions defining an annulus therebetween, said outer flange portion having an opening therein for the discharge of grass clippings from said annulus, a shaft rotatably mounted in said housing and extending and terminating within the confines of said inner baffle portion, a frusto-conical circular plate attached to said shaft at the smaller diameter end of said plate and with the larger diameter of said plate being of a diameter greater than that of said circular inner baffle portion to extend therebeyond and with the conical portion of said plate being disposed to extend beyond the plane of said inner baffle portion to overlap the latter, fan blades and cutter blades attached to the outer circumference of said plate and disposed between the upright planes of said portions, said cutter blades being pitched upwardly and said fan blades being disposed on the upper surface of said plate at the outer circumference thereof and extending upwardly therefrom and being pitched to face toward said outer flange portion with both said pitches arranged for blowing air radially outwardly and upwardly against the undersurface of said housing in said annulus to keep said clippings from clinging to said under surface.

2. A rotary lawn mower comprising a mower housing including a depending and circular outer flange portion and a depending and circular inner baffle portion spaced radially inward from said outer flange portion and terminating at an elevation above the lower end of said outer flange portion, said portions defining an annulus therebetween, said outer flange having an opening therein for the discharge of grass clippings from said annulus, a shaft rotatably mounted in said housing and extending and terminating within the confines of said inner baffle portion, a rotor attached to said shaft and including cutting blades disposed in said annulus, fan blades included in said rotor and disposed on the top thereof and being spaced radially inwardly from said cutting blade and in said annulus, said fan blades being pitched radially outwardly for blowing air upwardly against the under surface of said housing in said annulus to keep said clippings from clinging to said under surface.

3. A rotary lawn mower adapted for detachably supporting a grass catcher with an upright front wall and having a grass inlet opening in the front wall, comprising a mower housing including a circular outer flange portion and a circular inner baffle portion with both said portions depending on said housing and defining an annulus therebetween, ground wheels rotatably mounted on said housing for mobilizing the latter in a forward direction of movement, a grass discharge chute on the rear of said housing and being in flow communication with said annulus and projecting to beyond the rear of said housing for being received by said opening in said catcher to support the latter, a rotor rotatably mounted in said housing and including an edge extending to said annulus, fan blades and cutter blades included in said rotor and mounted on said edge thereof with said fan blades being disposed in said annulus closer to said inner baffle portion than said outer flange and pitched radially outwardly in a direction for creating a flow of air outwardly and upwardly in said annulus and therealong from the front of said housing to said chute upon rotation of said rotor.

4. A rotary lawn mower comprising a mower housing including a depending and circular outer flange portion and a depending and circular inner baffle portion spaced radially inward from said outer flange portion and terminating at an elevation above the lower edge of said outer flange portion, said portions defining an annulus therebetween, said outer flange having an opening therein for the discharge of grass clippings from said annulus, a shaft rotatably mounted in said housing and extending and terminating within the confines of said inner flange, a frusto-conical circular plate attached to said shaft at the smaller diameter end of said plate and with the larger diameter of said plate being of a diameter greater than that of said circular inner baffle portion to extend therebeyond and with the conical portion of said plate being disposed to extend beyond the vertical plane of said inner baffle portion to overlap the latter, and cutter blades attached to the outer circumference of said plate and disposed between the vertical planes of said portions.

5. A rotary lawn mower comprising a mower housing including a depending and circular outer flange portion and a depending and circular inner baffle portion spaced radially inward from said outer flange portion and terminating at an elevation above the lower edge of said outer flange portion, said portions defining an annulus therebetween, said outer flange having an opening therein for the discharge of grass clippings from said annulus, a shaft rotatably mounted in said housing and extending and terminating within the confines of said inner baffle portion, a circular plate attached to said shaft at the center of said plate and with the outer diameter of said plate being of a diameter greater than that of said circular inner baffle portion to extend therebeyond to overlap the latter, cutter blades attached to the outer circumference of said plate and disposed between the vertical planes of said portions, and fan blades attached to said plate and disposed thereon between said vertical planes and spaced radially inward with respect to said cutter blades and closer to said inner baffle portion than to said outer flange portion and being pitched radially outwardly.

6. In a rotary lawn mower in combination, a housing having a top, a vertical power shaft depending from said top, a blade mounted on said shaft for horizontal rotation, said blade having downwardly offset cutting edges oppositely disposed for a portion of its length at the outer ends thereof, a vertical skirt depending from the perimeter of said top disposed exteriorly of the outer ends of said blade and extending below the ends thereof, and a concentric cylindrical baffle depending from the top of said housing at the approximate inner ends of said downwardly offset cutting edges to a point below the non-offset portion of said blade to form a circular cutting retaining channel.

7. In a rotary lawn mower in combination, a housing having a top, a vertical power shaft depending from said top, a cutter mounted on said shaft for horizontal rotation, said cutter having downwardly offset cutting edges oppositely disposed for a portion of said cutter at the outer extremity thereof, a vertical skirt depending from the perimeter of said top disposed exteriorly of the outer extremity of said cutter and extending below the extremity thereof, and a concentric cylindrical baffle depending from the top of said housing at the approximate inner ends of said downwardly offset cutting edges to a point below the non-offset portion of said cutter to form a circular cutting retaining channel.

8. In a rotary lawn mower in combination, a housing having a top, a vertical power shaft depending from said top, a blade support with blades mounted on said shaft for horizontal rotation, said blades having downwardly offset cutting edges oppositely disposed at the outer ends thereof, a vertical skirt depending from the perimeter of said top disposed exteriorly of the outer ends of said blades and extending below the ends thereof, and a concentric cylindrical baffle depending from the top of said housing at the approximate inner ends of said downwardly offset cutting edges to a point below the non-offset portion of said blade support member to form a circular cutting retaining channel.

9. A rotary lawn mower comprising a mower housing including a top and a depending outer flange portion and a depending and circular inner baffle portion spaced radially inward from said outer flange portion and terminating at an elevation above the lower edge of said outer flange portion, said portions defining an annulus therebetween, a shaft rotatably mounted in said housing and extending and terminating concentric with respect to and within the confines of said inner baffle portion, and a rotor attached to said shaft at an elevation above the lower edge of said inner baffle portion and extending radially beyond the latter in a vertically offset portion and to said annulus in the radially outer portion of said rotor and including grass cutting edges oppositely disposed on said rotor and in said annulus at the radially inner portion of said annulus.

References Cited in the file of this patent
UNITED STATES PATENTS

| | | |
|---|---|---|
| 2,737,772 | Jacobsen | Mar. 13, 1956 |
| 2,836,029 | Johnson | May 27, 1958 |
| 2,872,770 | Murphy et al. | Feb. 10, 1959 |
| 2,877,616 | Gewalt et al. | Mar. 17, 1959 |
| 2,953,888 | Phillips et al. | Sept. 27, 1960 |